United States Patent [19]
Amri et al.

[11] Patent Number: 5,535,199
[45] Date of Patent: Jul. 9, 1996

[54] TCP/IP HEADER COMPRESSION X.25 NETWORKS

[75] Inventors: Adel Amri; Thomas H. Hull, both of Meylan, France

[73] Assignee: Sun Microsystems, Inc., Mountain View, Calif.

[21] Appl. No.: 301,449

[22] Filed: Sep. 6, 1994

[51] Int. Cl.$^6$ ............... H04B 1/66; H04L 9/00
[52] U.S. Cl. ............ 370/60; 370/85.13; 370/96.1; 370/109; 370/110.1
[58] Field of Search .................. 370/94.1, 94.2, 370/95.2, 109, 110.1, 118, 58.1–58.3, 60, 79, 82, 85.13, 94.3; 341/51, 65; 380/48, 49; 375/222, 231, 240; 395/325, 375, 500, 725, 800; 364/240.8, 240.9, 242.94, 242.95, 242.96, 242.5

[56] References Cited

U.S. PATENT DOCUMENTS

| | | | |
|---|---|---|---|
| 4,905,282 | 2/1990 | McGlynn et al. | 375/222 |
| 5,179,378 | 1/1993 | Ranganathan et al. | 341/51 |
| 5,293,379 | 3/1994 | Carr | 370/94.1 |
| 5,307,347 | 4/1994 | Duault et al. | 370/110.1 |
| 5,307,413 | 4/1994 | Denzer | 370/109 |
| 5,309,437 | 5/1994 | Perlman et al. | 370/94.1 |
| 5,351,237 | 9/1994 | Shinohara et al. | 370/110.1 |

OTHER PUBLICATIONS

Introduction to the Internet Protocols, Computer Science Facilities Group, Rutgers the State University of New Jersey, Jul. 3, 1987 by Charles L. Hedrick, email pp. 1-2 through 29-30.

Open System Interconnection (OSI), Sun Microsystems, Inc., Dec. 1990, 21 pages.

Compressing TCP/IP Headers for Low-Speed Serial Links, V. Jacobson, Feb. 1990, 45 pages.

*Primary Examiner*—Alpus H. Hsu
*Assistant Examiner*—Ricky Q. Ngo
*Attorney, Agent, or Firm*—Erwin J. Basinski

[57] ABSTRACT

A process and apparatus are disclosed wherein a local data terminal equipment ("DTE") node which has the capability of using RFC 1144 TCP/IP header compression/decompression, can negotiate with an unknown remote DTE located at another end of a TCP/IP/X.25 network link, to determine if the remote DTE also supports RFC 1144 TCP/IP header compression/decompression. The disclosed apparatus and process permits a user (such as a systems administrator, for example) to instruct the local DTE that a remote DTE is known to support TCP/IP header compression/decompression whereby the local DTE sets its routing information to record this information. Alternatively, the local DTE can automatically query an unknown remote DTE to determine if it supports TCP/IP header compression/decompression and set its routing information accordingly.

17 Claims, 10 Drawing Sheets

TYPICAL PROTOCOL STACK

LAN/X.25

TYPICAL PROTOCOL STACK

TCP/IP/X.25 HEADER CONFIGURATION

TCP/IP HEADER COMPRESSION X.25 NETWORKS

BACKGROUND OF THE INVENTION

This invention relates to the field of computer communications networks and more specifically to an improved apparatus and method for increasing the transmission efficiency of messages over a network which uses the X.25 protocol for packet switched network control.

PRIOR ART BACKGROUND

Computer-to-computer communication networks are becoming larger and larger and message traffic on these networks is increasing exponentially. It is desirable therefore that message transmission on these networks be made as efficient as possible.

In the past, attempts have been made to develop specialized protocols which limit the overhead required in transmitting data over a local area network ("LAN") and to make use of certain inherent characteristics of a given network type to minimize the message overhead in a given communications session. Message overhead is the header information which is appended to the data portion of a message. Such header information is necessary to permit various portions of a network to keep track of the administrative and procedural tasks required to send data from one computer to another. One measure of overhead efficiency is the ratio of DATA to DATA+HEADER. That is, the smaller the amount of HEADER information required, the more efficient is the network protocol. One attempt to improve the efficiency of a protocol is the header compression methodology outlined in "Compressing TCP/IP Headers for Low-Speed Serial Links," by V. Jacobson, Network Working Group Request for Comments: 1144, February 1990 (hereinafter "Van Jacobson" or alternatively "RFC 1144") which is hereby fully incorporated herein by reference. Note: TCP/IP is an acronym for Transmission Control Protocol/Internet Protocol, a suite of protocols for dealing with communications between heterogeneous computers. The TCP is responsible for breaking up the message to be transmitted into datagrams (i.e. a collection of data that is sent as a single message), reassembling them at the other end of the communications network, resending anything that gets lost, and putting things back in the right order. The IP is responsible for routing individual datagrams. TCP simply hands IP a datagram with a destination. IP doesn't know how this datagram relates to any datagram before it or after it. To keep track of details such as source and destination port numbers, datagram sequence number, checksums and other control data, TCP attaches a header to each datagram and hands off a combined header+datagram to IP. IP then adds its own header to this "TCPheader+datagram" so that the resulting packet of data looks like "IPheader+TCPheader+datagram." In cases where the application is character-based such as telnet, rlogin, or xterm, or the ftp control channel, the headers can be 40 bytes or more long for each byte of data transferred. The words datagram and packet are often used interchangeably although "datagram" is correctly defined as a unit of data, which is what the protocols deal with. A "packet" is a physical thing, appearing on the Ethernet or some wire. In most cases a packet contains one datagram. However, when a LAN is connected to another network such as Ethernet or to a PDN the TCP/IP datagram may be broken up into smaller pieces (if the datagram if a big file for example) and another header appended to each smaller piece or "packet". For example, when TCP/IP is used on top of X.25 (CCITT standard for the protocols and message formats that define the interface between a terminal and a PDN packet switching network), the X.25 interface breaks the datagrams up into 128 byte packets, each with an additional X.25 header. This is invisible to IP because the packets are put back together again at the other end of the communications link before passing the datagram back to TCP/IP. Nevertheless there may be many more "headers" involved with such transmissions which do not use the TCP/IP header compression technique. In the case of character applications described above, the TCP/IP headers+data get another X.25 header attached. For more basic information about TCP/IP see "Introduction to Internet Protocols" by Charles L. Hedrick, Computer Sciences Facilities Group, Rutgers University, July 1987.

Present day computers are connecting LANs into world wide networks and typically use a PDN in some part of the network connection. Leased lines (the primary alternative to X.25 service) are more expensive and more difficult to obtain outside of the U.S., and are frequently non-existent across some national boundaries. Since X.25 is more widely used in Europe and the Far East than in the U.S., it is being used more heavily by smaller companies as well as large international companies with world-wide offices as they become more dependent on world-wide telecommunications technology. There are two main characteristics which govern the cost of using public X.25 networks:

1. The charge for the use of the network is usually based on the amount of data sent; and
2. The rental cost of the connection increases rapidly for higher speed connections. It therefore follows that increasing TCP/IP efficiency when using the PDN X.25 networks would reduce costs by 1) reducing the overall amount of data sent, and 2) by possibly using a cheaper X.25 connection because the total required bandwidth is decreased due to the header compression using the Van Jacobson scheme.

Unfortunately, at the present time the Van Jacobson header compression scheme is not used when two systems are communicating over an X.25 network because it is normally not possible to determine a priori if a remote system supports the Van Jacobson compression system when using a packet switching system. Therefore some means of negotiating its use is required.

SUMMARY OF THE INVENTION

The present invention, as more fully described below, is a method and apparatus for negotiating the use of the Van Jacobson header compression/decompression scheme between remote nodes in a TCP/IP/X.25 network, thereby providing a significant reduction in the header data transmitted via the PDN's X.25 service, and for automatically storing that fact and retaining it in the network routing files for that session. In addition, the present invention provides an elegant method for implementing the use of the Van Jacobson header compression/decompression scheme in a TCP/IP/X.25 network.

A process and apparatus are disclosed wherein a local data terminal equipment ("DTE") which has the capability of using RFC 1144 TCP/IP header compression/decompression can communicate with an unknown remote DTE located at another end of a TCP/IP/X.25 network link, to determine if the remote DTE also supports RFC 1144 TCP/IP header compression/decompression. The disclosed apparatus and process permits a user to instruct the local DTE that a remote DTE is known to support TCP/IP header compression/decompression whereby the local DTE sets its routing information to record this information. Alternatively, the local DTE can automatically query an unknown remote DTE to determine if it supports TCP/IP header compression/decompression and set its routing information accordingly.

The method for using TCP/IP header compression/decompression in a communications network which uses an X.25 packet switching link in the network includes a process whereby a first DTE in a network issues a first call request to a remote DTE. This first call request contains a specific communications protocol identifier ("PID") in a user data field which indicates that the first DTE will use TCP/IP header compression/decompression. The remote DTE upon sensing this PID will return either a call accept message indicating that it is also capable of using TCP/IP header compression/decompression, or a call clear message which indicates that it cannot support TCP/IP header compression/decompression. Whichever return signal the first DTE gets from the remote DTE, the first DTE adjusts its internal controls to use or not use TCP/IP header compression/decompression accordingly.

The invention includes a telecommunications system and a DTE which uses TCP/IP/X.25 networks, and which has the capability of automatically determining whether a remote DTE can or cannot accommodate TCP/IP header compression/decompression.

DESCRIPTION OF THE DRAWINGS

The objects, features and advantages of the system of the present invention will be apparent from the following/description in which.

NOTATIONS AND NOMENCLATURE

Figure 1:
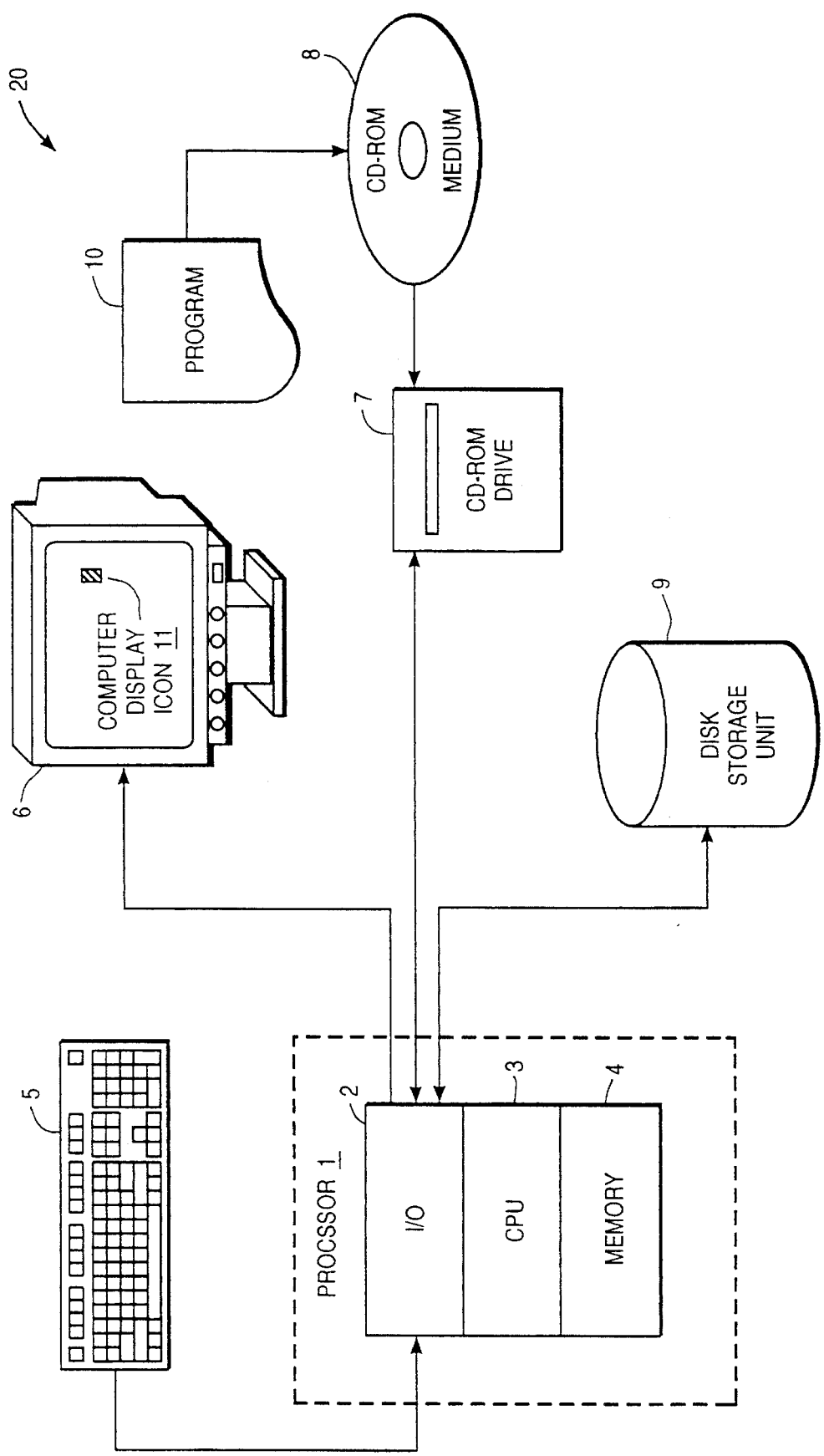
FIG. 1 illustrates a typical workstation which may be used as a data terminal equipment (DTE) in a telecommunications network.

The detailed descriptions which follow are presented largely in terms of processes and symbolic representations of operations on data bits within a computer memory. These process descriptions and representations are the means used by those skilled in the data processing arts to most effectively convey the substance of their work to others skilled in the art.

A process is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations derformed by a human operator. No such capability of a human operator is necessary, or desirable in most cases, in any of the operations described herein which form part of the present invention; the operations are machine operations. Useful machines for performing the operations of the present invention include general purpose digital computers or similar devices. In all cases there should be bourne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The processes presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

The Van Jacobson header compression system (as defined in RFC 1144 which is incorporated herein by reference) is a method of improving the efficiency of TCP/IP based applications by encoding the packet header and reducing its size. This results in an improvement in the ratio of the number of data bytes to the total number of bytes sent across a network.

While this system applies equally to any TCP/IP application the effect is particularly pronounced when using character-based applications such as telnet, rlogin, or xterm, or the ftp control channel. In these cases, 40 bytes of protocol information may be sent in the IP header for each byte of data transferred. In tests it has been found that this header compression system can improve the efficiency of a typical Telnet session up to 6 times. Currently RFC 1144 has been specified for IP/SLIP and IP/PPP, but to date there has been no tractable procedure for using RFC 1144 in a network where a PDN X.25 packet switching link forms a connecting part of the network link, wherein some terminals are capable of supporting header compression/decompression and some are not.

A process and apparatus are disclosed wherein a local data terminal equipment ("DTE") node which has the capability of using RFC 1144 TCP/IP header compression/decompression, can negotiate with an unknown remote DTE located at another end of a TCP/IP/X.25 network link, to determine if the remote DTE also supports RFC 1144 TCP/IP header compression/decompression. The disclosed apparatus and process permits a user (such as a systems administrator, for example) to instruct the local DTE that a remote DTE is known to support TCP/IP header compression/decompression whereby the local DTE sets its routing information to record this information, as more fully described below. Alternatively, the local DTE can automatically query an unknown remote DTE to determine if it supports TCP/IP header compression/decompression and set its routing information accordingly. The implementation of the invention, while it may be used in any relevant TCP/IP/X.25 network context with any computer program product acting as a DTE, is described in the context of a particular type of network control system and exemplary programming systems for illustrative purposes. However, no specific knowledge of the illustrated system is required by those skilled in these arts to understand and implement the process and system described in this disclosure, using various other network systems and related tools. This invention may be implemented on any network having some terminals which support header compression/decompression and some terminals which do not have such support.

Operating Environment

The environment in which the present invention is used encompasses the general distributed computing system, wherein general purpose computers, workstations, or personal computers are connected via communication links of various types, in a client-server arrangement, wherein programs and data, many in the form of objects, are made available and shared by various members of the system for execution and access by other members of the system. Some of the elements of a general purpose workstation computer 20 are shown in FIG. 1, wherein a processor 1 is shown, having an Input/output ("I/O") section 2, a central processing unit ("CPU") 3 and a memory section 4. The I/O section 2 is connected to a keyboard 5, a display unit 6, a disk storage unit 9 and a CD-ROM drive unit 7. The CD-ROM unit 7 can read a CD-RGM medium 8 which typically contains programs 10 and data. A computer display icon 11 is shown on the display unit 6. Similar workstations may be connected by a communications path to form a distributed computer system and will generally be referred to herein as Data Terminal Equipments ("DTEs").

The present invention will be discussed below in terms of basic background and underlying technology to provide a summary of what the invention is and how it functions, followed by a detailed description of how to use the invention.

Underlying Technology

The X.25 Protocol

X.25 is a data communications protocol produced by the Comite Consultatif International de Telephone and Telegraph (CCITT), a standards making body that is part of the International telecommunications Union. X.25 dates from 1976 and is defined as being the protocol governing connection between packet mode data terminal equipment (DTEs, the device at the user's end) and data circuit-termination equipment (DCEs, the device at the network end). X.25, like any other data communications protocol, specifies how data may be exchanged between any two systems in a reliable, flow-controlled manner. The protocol defines mechanisms for call set-up and termination (known as "clearing") and other functions necessary for the smooth functioning of a data communications link. The CCITT X.25 specification describes a distinct protocol to be performed by a DCE and a separate protocol to be performed by a DTE. Generally, Public/Private Data Networks ("PDNs") provide DCE implementations of X.25, while computer vendors provide DTE implementations of X.25. The CCITT X.25 recommendation provides a full description of the X.25 protocol. The description of the exemplary systems used in the present invention make use of systems based on the 1988 CCITT X.25 specification.

The TCP/IP Protocol

The TCP/IP protocol was briefly defined in the Background section and is more fully described in various RFCs, the most important of which have been collected into a three volume set titled the DDN Protocol Handbook, published by SRI International, Menlo Park, Calif. 94025, and which are generally available via anonymous FTP from sri-nic.arpa in fries rfc:rfc-index.txt and rfc:rfcxxxx.txt.

Figure 2:
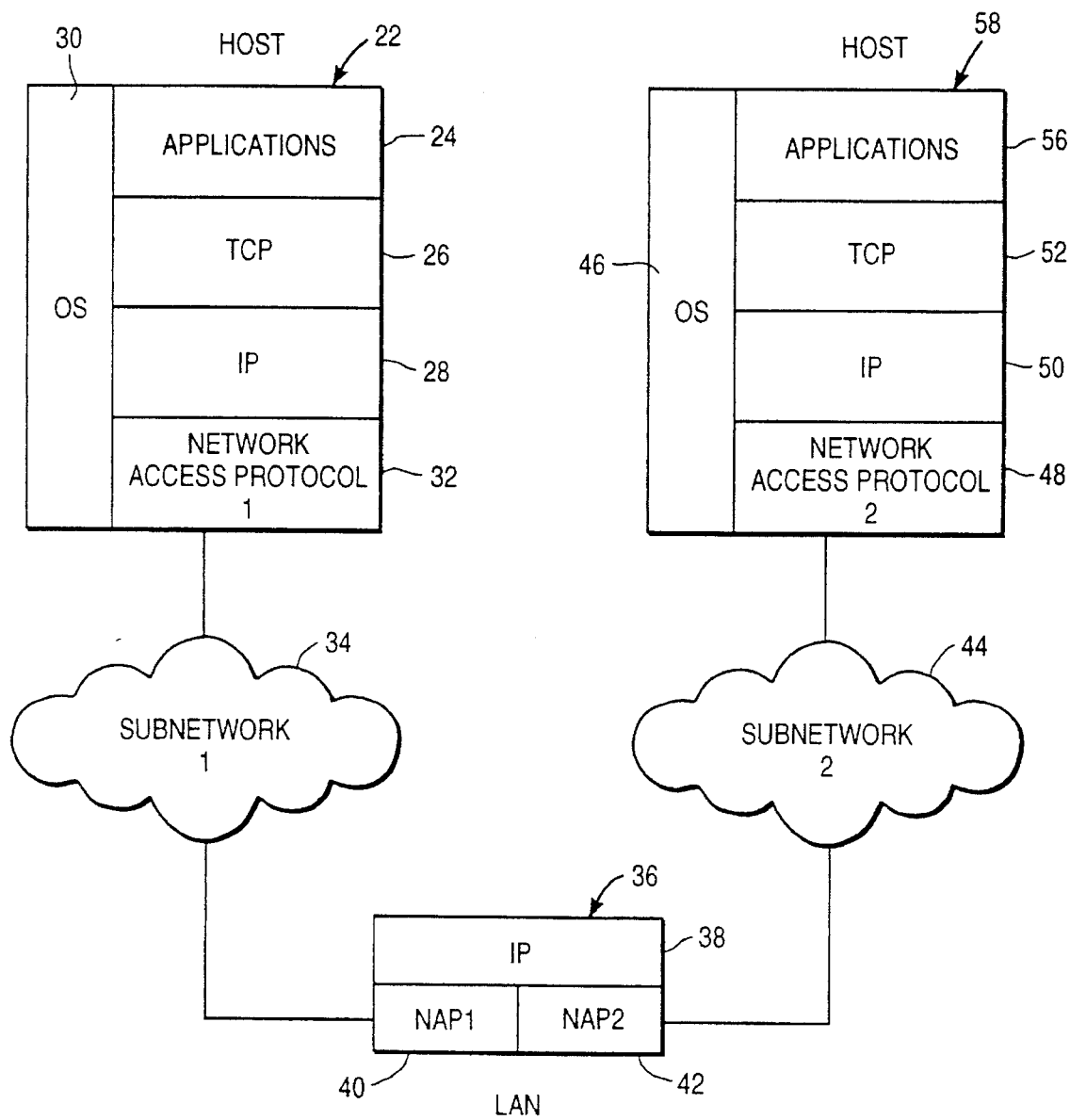
FIG. 2 illustrates a typical TCP/IP Local Area Network ("LAN") connection.

Referring now to FIG. 2, a typical TCP/IP system 20 is shown to indicate how TCP and IP are configured for communications and to illustrate that the total communications facility may consist of multiple networks ("subnetworks"). Some sort of network access protocol, such as token ring or FDDI etc. is used to connect the DTE to a subnetwork. In FIG. 2, a host computer 22 acting as a DTE contains an Operating System ("OS") 30, applications programs 24, the host-to-host protocol ("TCP") 26, a copy of the Internet protocol implementation ("IP") 28 and a first network access protocol (NAP1) 32. This first network access protocol 32 enables host 22 to send data across a first subnetwork 34 to router 36 which contains an implementation of IP 38, a copy NAP1 40 of the first network access protocol 32, and a copy NAP2 42 of a second network access protocol 48 which is on a second host 58 and which in general allows host 58 to communicate with the router 36 via a different subnetwork 44. The second host 58 also has an OS 46, applications 56, a TCP layer 52 and an IP layer 50. IP is implemented in all of the end systems and the routers. It acts as a relay to move a block of data from one host, through one or more routers, to another host. TCP is implemented only in the end systems where it keeps track of the blocks of dam to assure that all are delivered reliably to the appropriate application.

Figure 3:
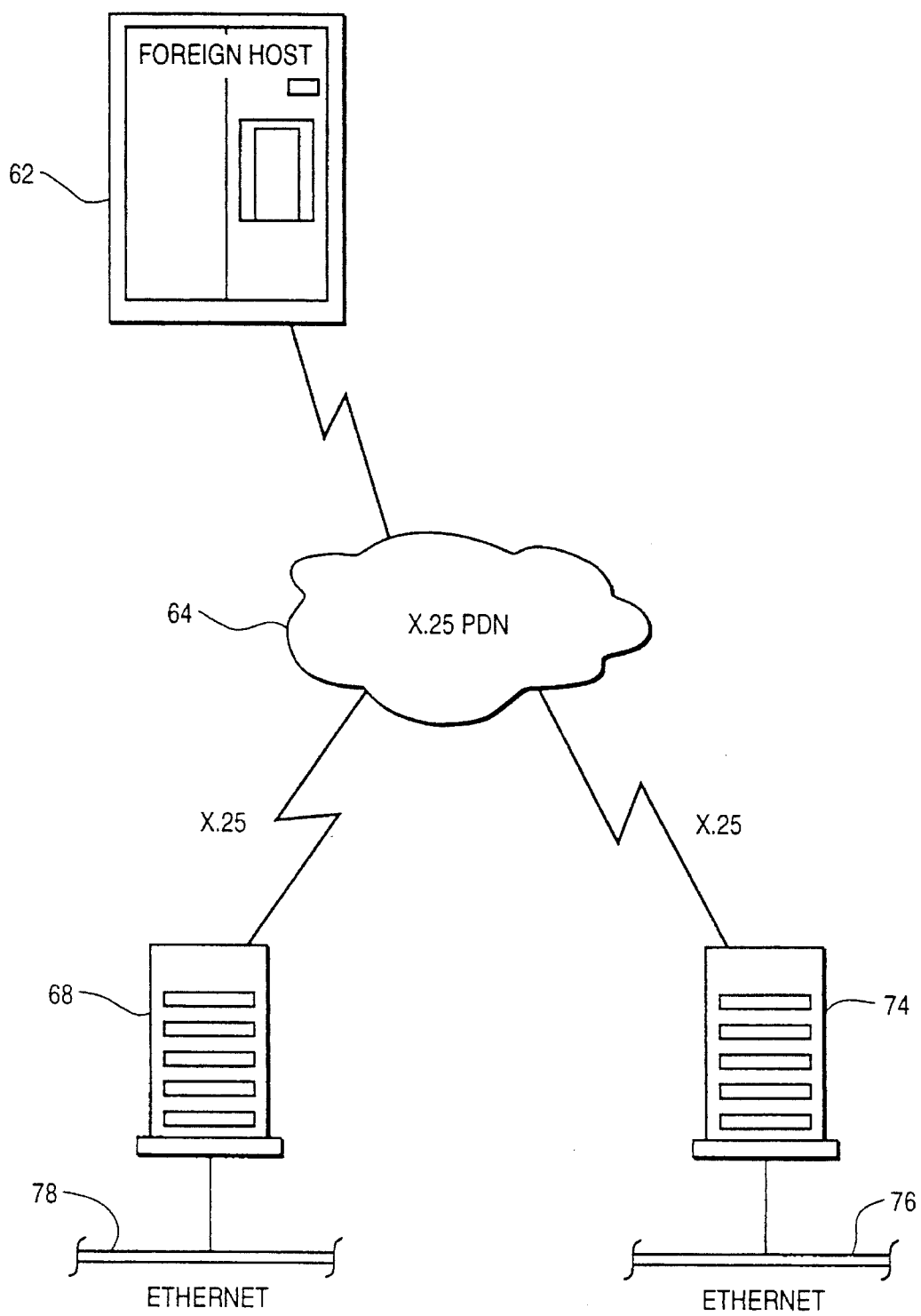
FIG. 3 illustrates a typical LAN/X.25 network configuration.
Figure 4:
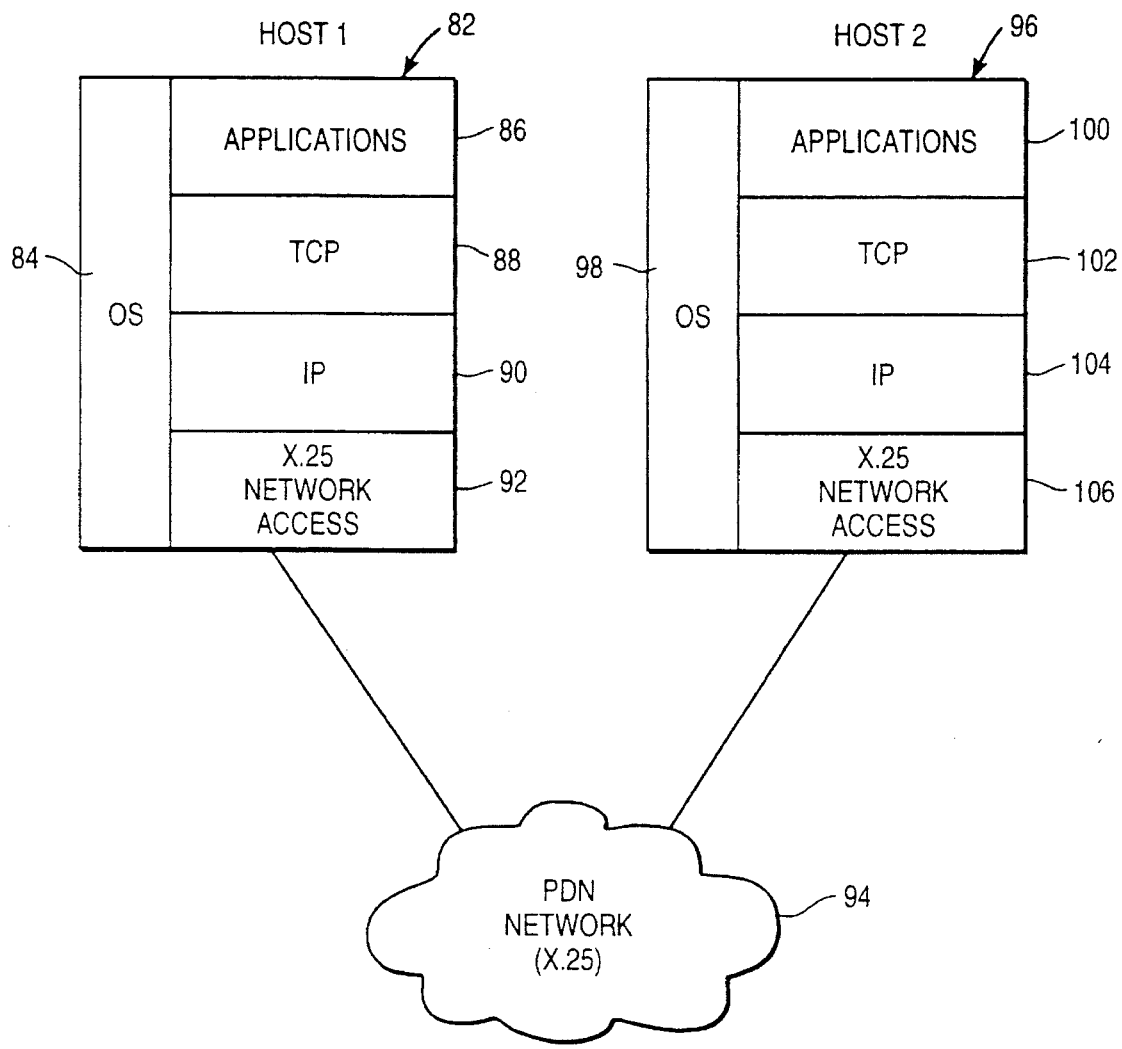
FIG. 4 illustrates a typical TCP/IP/X.25 protocol stack arrangement.

One of the subnetworks which links various hosts in a communications system could be a PDN X.25 packet switching network. For example, in FIG. 3 foreign host 62 is connected to an X.25 subnetwork 64 which itself is connected to a SunLink X.25 gateway 68 connected to an Ethernet subnetwork 78, another SunLink X.25 gateway 74 connected to another Ethernet subnetwork 76. In each of these systems (i.e. foreign host 62, SunLink X.25 gateway 68 and SunLink X.25 gateway 74) the protocol stack 80 could be as shown in FIG. 4. In FIG. 4 host1 82 contains its OS 84, applications 86, a TCP layer 88, IP layer 90 and an X.25 network access protocol layer 92 for communicating with a PDN X.25 network 94. Host2 96 similarly has its OS 98, applications 100, TCP layer 102, IP layer 104 and its X.25 network access protocol layer 106. A gateway could have only an IP layer, and X.25 protocol layer.

Figure 5:
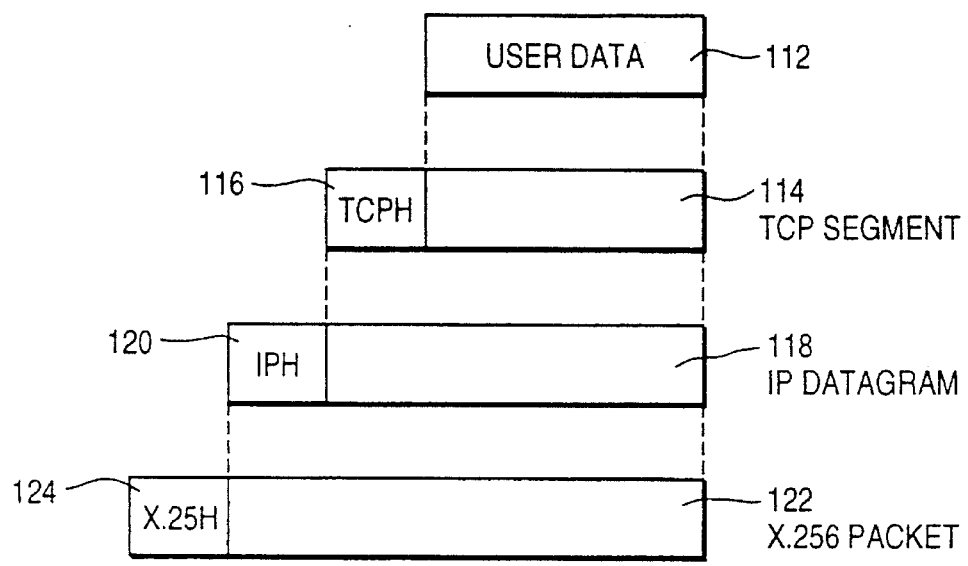
FIG. 5 illustrates the possible TCP/IP/X.25 header-data configurations.
Figure 5:
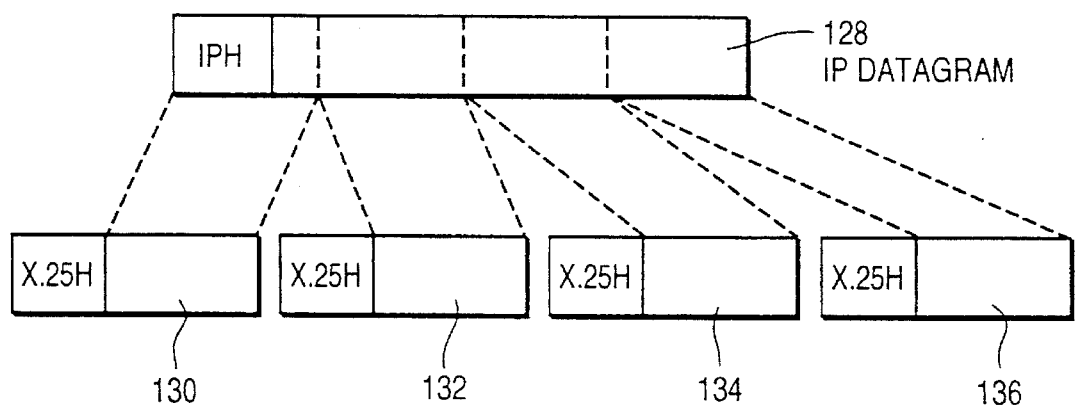

In the TCP/IP/X.25 network link of FIG. 4 the data packets sent from host (or DTE) to host (DTE) would generally be configured as shown in FIG. 5. In the data configuration system 110 of FIG. 5, a block of user data 112 (which is called a "datagram" and which could be one character or as large as 1500 octets, an "octet" being a term used in the Internet documentation to mean 8 bits because some systems use "byte" to mean more than 8 bits) is shown. This datagram 112 gets a TCP header 116 attached to it and becomes a TCP segment 114. This TCP segment 114 gets an IP header 12t) attached to it and be, comes an IP datagram 118. If the IP datagram 114 is less than 128 bytes it gets an X.25 header 124 attached to it and becomes an X.25 packet 122. If however the IP datagram 128 is larger than 128 bytes, it gets broken up into 128 byte packets 130–136 each with its own X.25 header.

As indicated above, in cases where the application is character-based such as telnet, rlogin, or xterm, or the ftp control channel, the headers can be 40 bytes or more long for each byte of data transferred. Efficiency and cost control therefore mandates that these headers be minimized wherever possible, and the currently most effective TCP header compression scheme known is the Van Jacobson scheme. The need therefore is for a method to permit two unknown hosts on an TCP/IP/X.25 link to use the Van Jacobson TCP header compression/decompression scheme wherever possible.

The Invention

In the preferred embodiment, a method and apparatus for negotiation between two hosts/DTEs is implemented within the framework of the system called SunLink® X.25 a product of Sun Microsystems® Inc. the assignee of the present invention. (SUN, SUN MICROSYSTEMS and SUNLINK are registered trademarks of Sun Microsystems Inc.). However those skilled in the arts will recognize that the method of the present invention may be implemented in any programming language, in any computer, DTE, communications system, and/or network access process making use of the TCP/IP and X.25 protocols or any network wherein some terminals can support header compression/ decompression and some cannot.

There are two methods for determining the use or non-use of the Van Jacobson TCP header compression/decompression by a remote DTE on a TCP/IP/X.25 network link:

1). As part of he routing information contained in a local host (ie. a DTE) it will be specified whether or not a remote system is known to support the TCP header compression/decompression scheme. In the preferred embodiment this information is stored in a routing table which is used to select links and SNPA addresses based on higher level addresses. Alternatively, such data could be stored in an existing routing table for X.25 or in a special routing table for this purpose only. This information can be supplied by a system administrator, or determined automatically as indicated below.

Figure 6A:
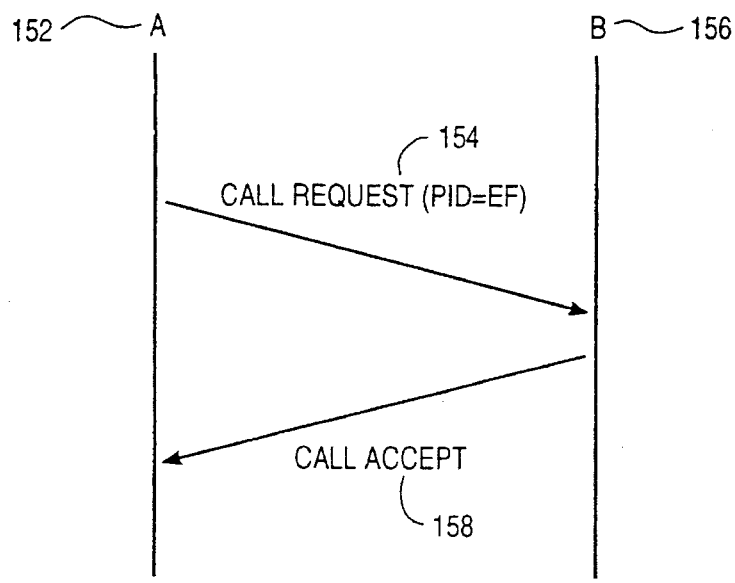
FIG. 6a illustrates the call request procedure from DTE A to DTE B wherein DTE B accepts the requested configuration.
Figure 6B:
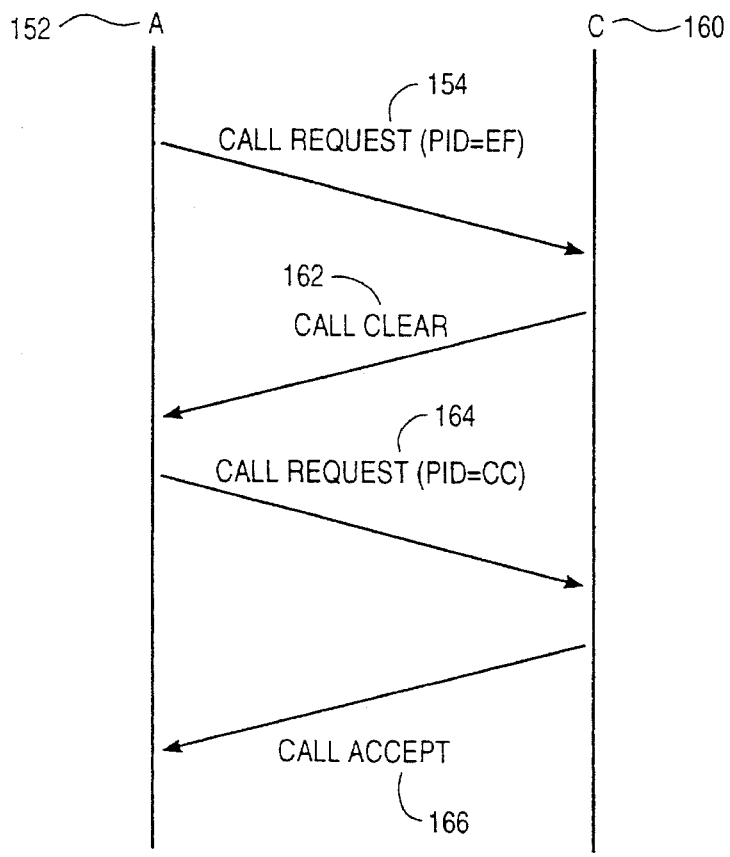
FIG. 6b illustrates the call request procedure from DTE A to DTE B wherein DTE B rejects the initial call request but accepts the second call request.
Figure 10:
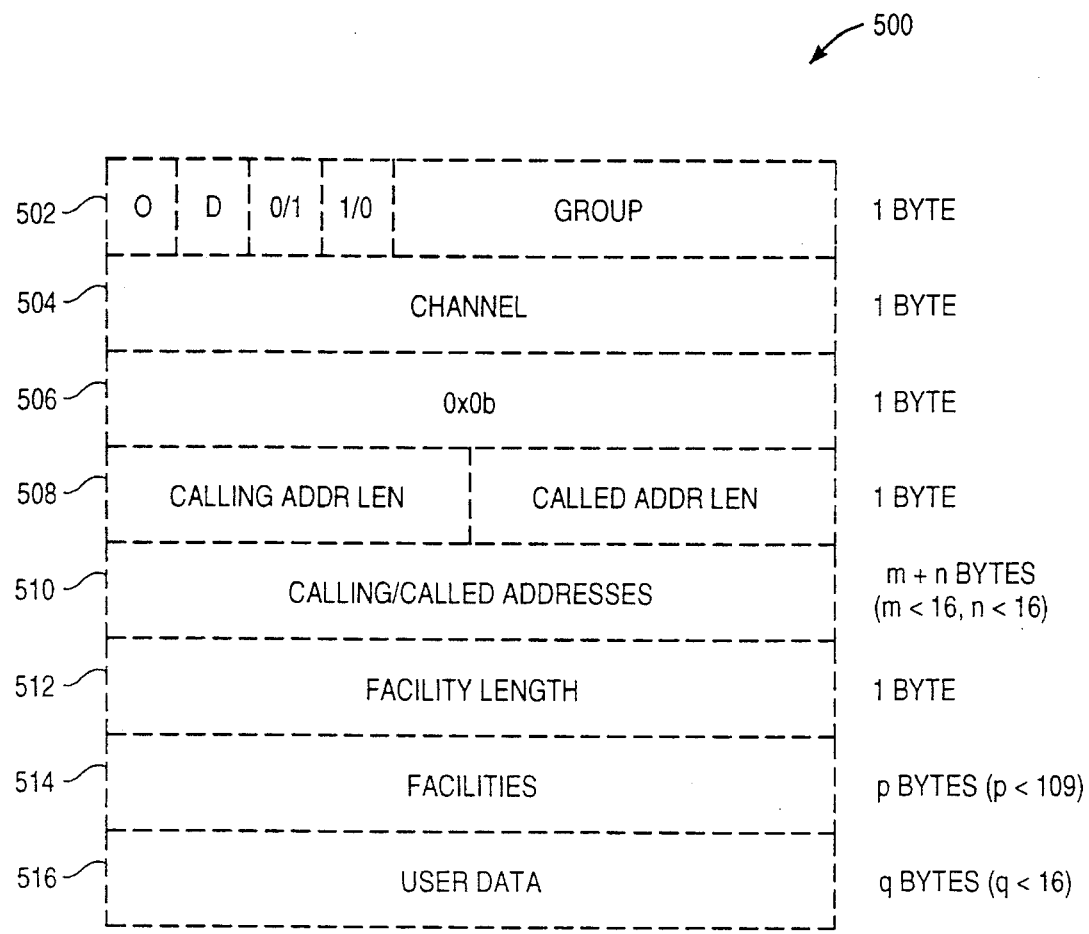
FIG. 10 illustrates a diagram of an X.25 packet format.

2). In the preferred embodiment the system/DTE initiating a call will use a specified Protocol identifier ("PID") in the User Data Field (516 in FIG. 10) of the Call Request Packet 500, to indicate that IP using RFC 1144 (the Van Jacobson scheme) is in use. The PID occupies the first one or more bytes of the User Dam area 516. For example, in the case of a PID=CC the User Data might be only a single byte containing the CC. In a preferred embodiment the specific PID has the value 0XEF. If this Call Request containing the specific PID is refused by the remote system/DTE then a second call request will be attempted with the PID set to OXCC, the standard PID for uncompressed TCP/IP. Whether the use of the compression scheme is agreed to or not the routing table specified in 1 above should be updated. The negotiation process 150 in FIG. 6 depicts the method just described. In FIG. 6a a first system/DTE 152 sends a Call Request packet containing the specific PID 154 to a remote system/DTE 156. The remote system/DTE 156 sensing the specific PID and confirming that it is adapted to support TCP/IP header compression/decompression, it would return a Call Accept 158 packet to the originating system/DTE 152. In FIG. 6b, again a first system/DTE 152 sends a Call Request packet containing the specific PID 154 to a remote system/DTE 160. This remote system/DTE 160 does not understand the specific PID 154 and therefore returns a Call Clear 162 packet. On receipt of the Call Clear 162 packet the first system/DTE 152 recognizes that the remote system/DTE 16 cannot support the TCP/IP Header compression/decompression scheme and therefore decides to see if remote system/DTE 160 can accept uncompressed TCP/IP data over this X.25 network link. Originating system/DTE 152 replaces the specific PID (PID=0×EF) with the standard PID (PID=0×CC) and sends another Call Request packet 164. If remote system/DTE 160 can accept uncompressed TCP/IP data over this X.25 network link then the remote system/DTE 160 returns a Call Accept packet 166 and the link is established.

Figure 7:
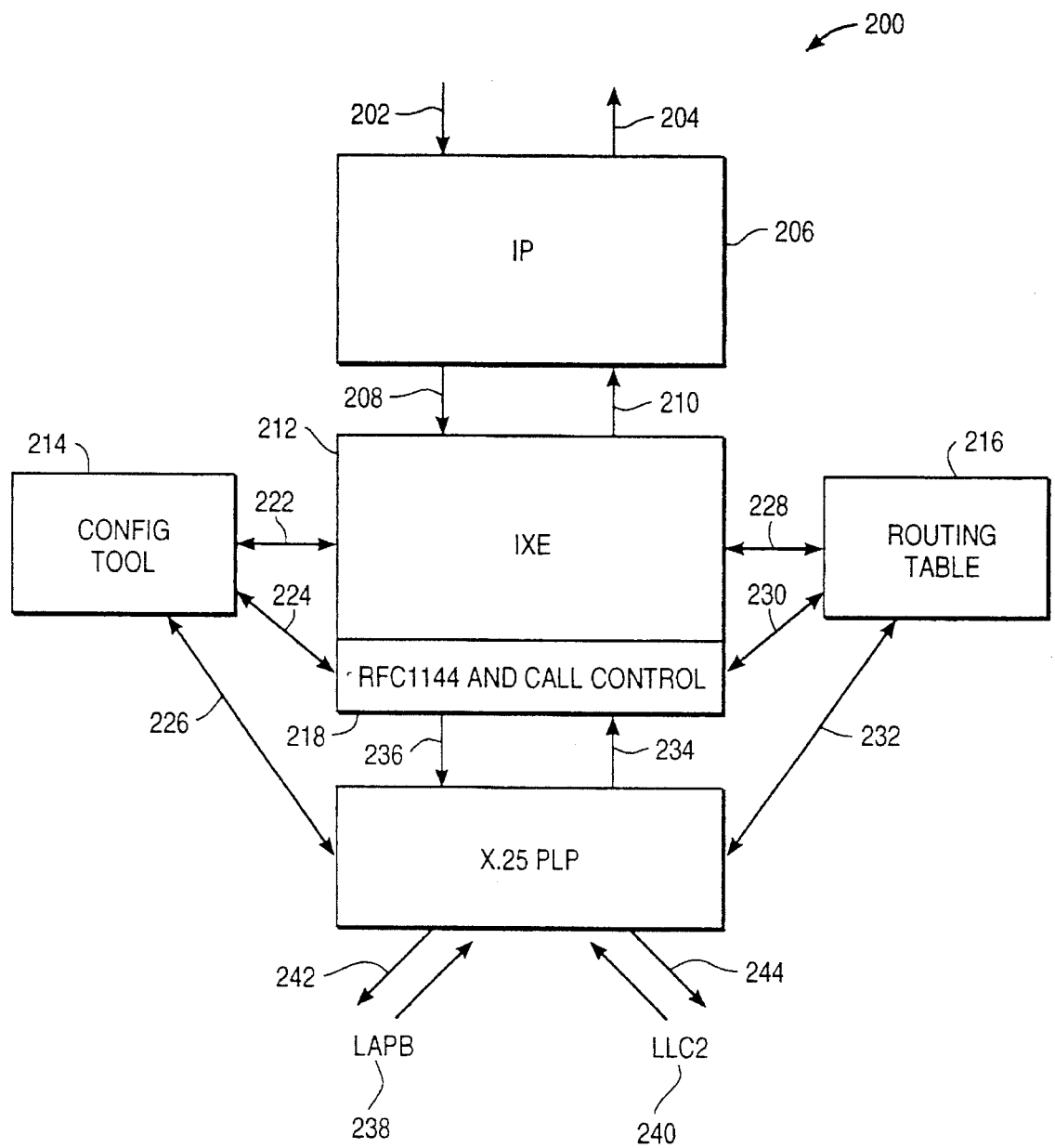
FIG. 7 illustrates the location of the present invention in the environment of the SunLink X.25 version 9.0 system.

In a preferred embodiment this Call Control negotiation and RFC 1144 control is implemented as an augmentation to an "IP to X.25 Encapsulation" module ("IXE"). Referring now to FIG. 7 the preferred embodiment of the present invention is illustrated in the context of SunLink X.25 version 9.0 200. In FIG. 7 an IP module 206 feeds data to the IXE module 212 via link 208. The IXE module 212 using the routing table 216 and the configuration tool 214 allows IP to run over X.25 and includes support for the Defense Data Network's ("DDN") X.25 Standard Service. The IXE module 212 is connected to the "RFC1144 and Call Control" module 218 which performs the Van Jacobson header compression/decompression if appropriate, as well as the determination upon message initiation, of whether the Jacobson header compression/decompression process is appropriate between two specific communicating locations. The RFC1144 and Call Control module 218 is connected to the "X.25 Packet Layer Protocol" module 220 which itself has connections to both a "Link Access Procedure-Balanced" ("LAPB") module 238 and a "Logical Link Control, type 2" ("LLC2") module 240. The LAPB module 238 provides layer 2 of X.25 for Wide Area Networks ("WANs "), and the LLC2 module 240 provides a "connection-oriented" operation which allows X.25 to run over Local Area Networks ("LANs").

The IXE, X.25 PLP, LAPB and LLC2 modules implement protocols and procedures that are well known in the art and are described generally without specific detail.

IXE (IP to X.25 Encapsulation)

This module is basically an M-to-N multiplexor ("mux"). This mux allows IP to run over X.25 and allows for both static and dynamic connections. Static connections are such that X.25 connections are always up, whereas dynamic connections are those where the X.25 connection is brought down after a user specified amount of idle time. On the upper side of the IXE module (212 in FIG. 7) there is one stream for each IP subnet using X.25 208, 210. On the lower side there is one stream per "Virtual Circuit" ("VC") 236, 234.

The STREAMS interfaces to this module are "connectionless Data Link Provider Interface" ("DLPI") (UNIX International's interface to layer 2) on the upper side of the module 208, 210, and "Network Layer Interface" ("NLI") (a Sun Microsystems, Inc. interface to layer 3) 236, 234, is used on the lower side of the IXE module 212. Any appropriate interface to protocol layer 3 which is well known in the art may be used in place of NLI. STREAMS or the Stream I/O system was originally designed for the 8th Edition of Research UNIX by Dennis Richie and is well known in the art and will not be described further herein. See, for example, "UNIX Network Programming" by W. Richard Stevens, PTR Prentice Hall, 1990, pages 374–378.

X.25 PLP (Packet Layer Protocol)

The X.25 PLP module 220 is an M-to-N mux. On the upper side 236, 234 there is one stream per Virtual Circuit. (There can also be streams used for management purposes). On the lower side of the X.25 PLP module 220 there is one stream per link (WAN or LAN) 242, 244. The Streams interfaces are NLI on the upper side 234, 236 and "Sun Microsystems, Inc.'s Link Layer Interface" ("SLI") on the lower side 242, 244 of the module. SLI is an interface to Protocol Layer 2. This Protocol Layer 2 is well known in the art and any interface mechanism to create an interface from the X.25 PLP module 220 to Layer 2 would be equivalent. DLPI would be a well known alternative interface to the SLI.

LAPB

The LAPB module 238 is a Streams mux. This mux supports both the LAP and LAPB protocols. On the upper side 242 there is one stream per WAN link, and on the lower side (not shown in FIG. 7) there is one stream per link as well. No multiplexing occurs in this module. There can also be additional streams to the upper side for tracing, and for statistics gathering. The STREAMS interfaces are: SLI on the upper side 242 and Sun's WAN driver interface on the lower side (not shown). This mux may also be adapted in the future to use the connection-oriented DLPI interface on the upper side and may be adapted to run under the ISDN B-channel protocol stack, as well as under X.25 PLP.

LLC1/2

This STREAMS driver (an M-to-1 mux) supports both LLC1 and LLC2. Only LLC2 is needed for X.25, but LLC1 is needed for running the ConnectionLess Network Protocol ("CLNP") over LANs. The CLNP and its ConnectionLess Network Service ("CLNS") is the Open Systems Interconnection ("OSI") protocol equivalent of IP. On the upper side of the mux 244 there can be one stream per Service Access Point ("SAP")/LAN connection pair. For example, if there is only one protocol, like X.25, registered with an LLC at a SAP, and there are two LAN devices underneath, there will be two active upper streams to the LLC mux. There are separate streams for LLC1 and LLC2 per SAP. On the lower side there is one stream per LAN driver. If there are multiple LAN drivers, LLC1/2 is an M-to-N mux. The STREAMS interfaces are: SLI and DLPI (connection-oriented for LLC2 and connectionless for LLC1) on the upper side, and connectionless DLPI on the lower side. The support for the SLI interface may be replaced by the X.25 mux adapted to DLPI.

The Invention Details

Figure 8:
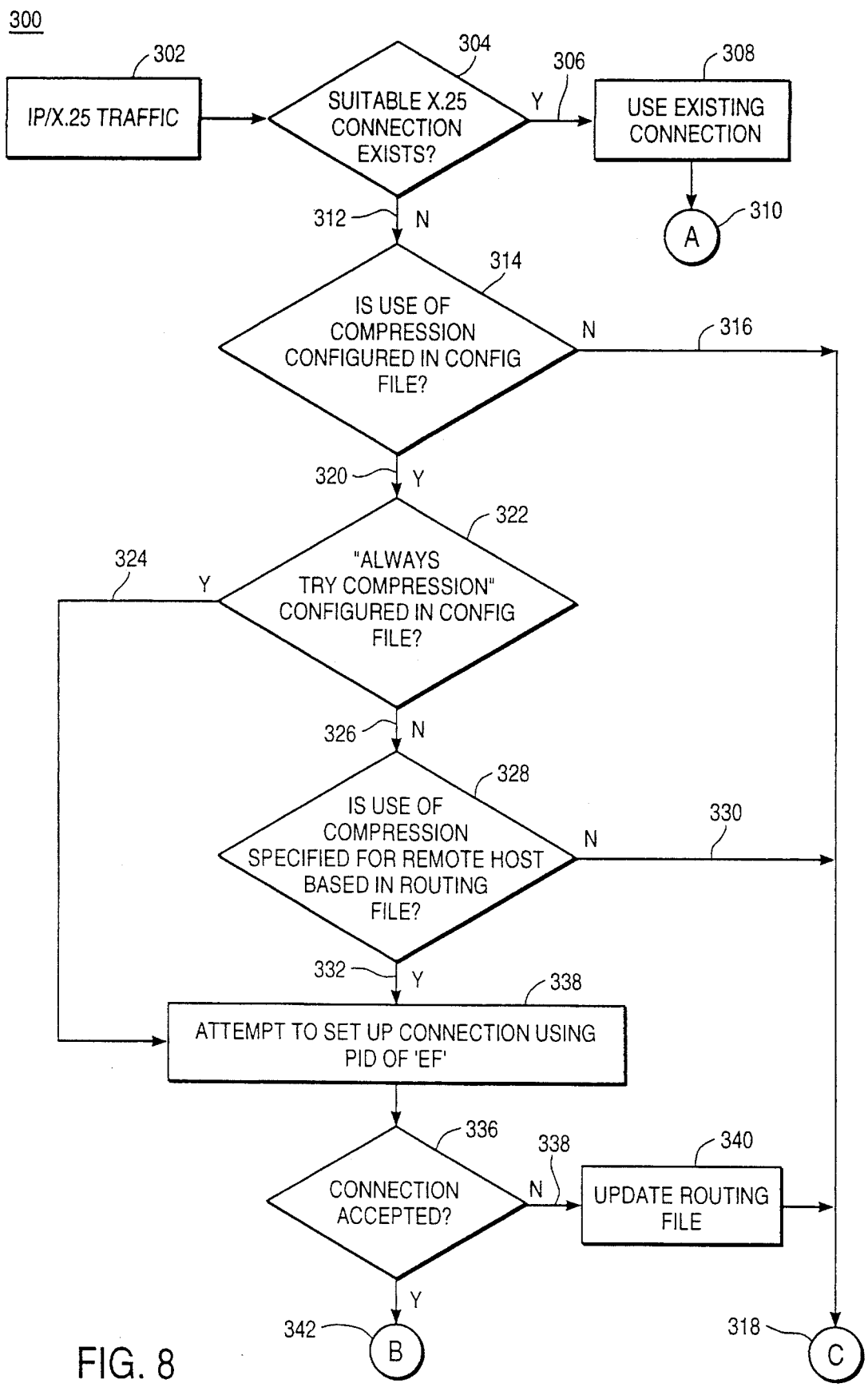
FIG. 8 illustrates a block diagram of the RFC 1144 and Call Control system of the present invention.
Figure 9:
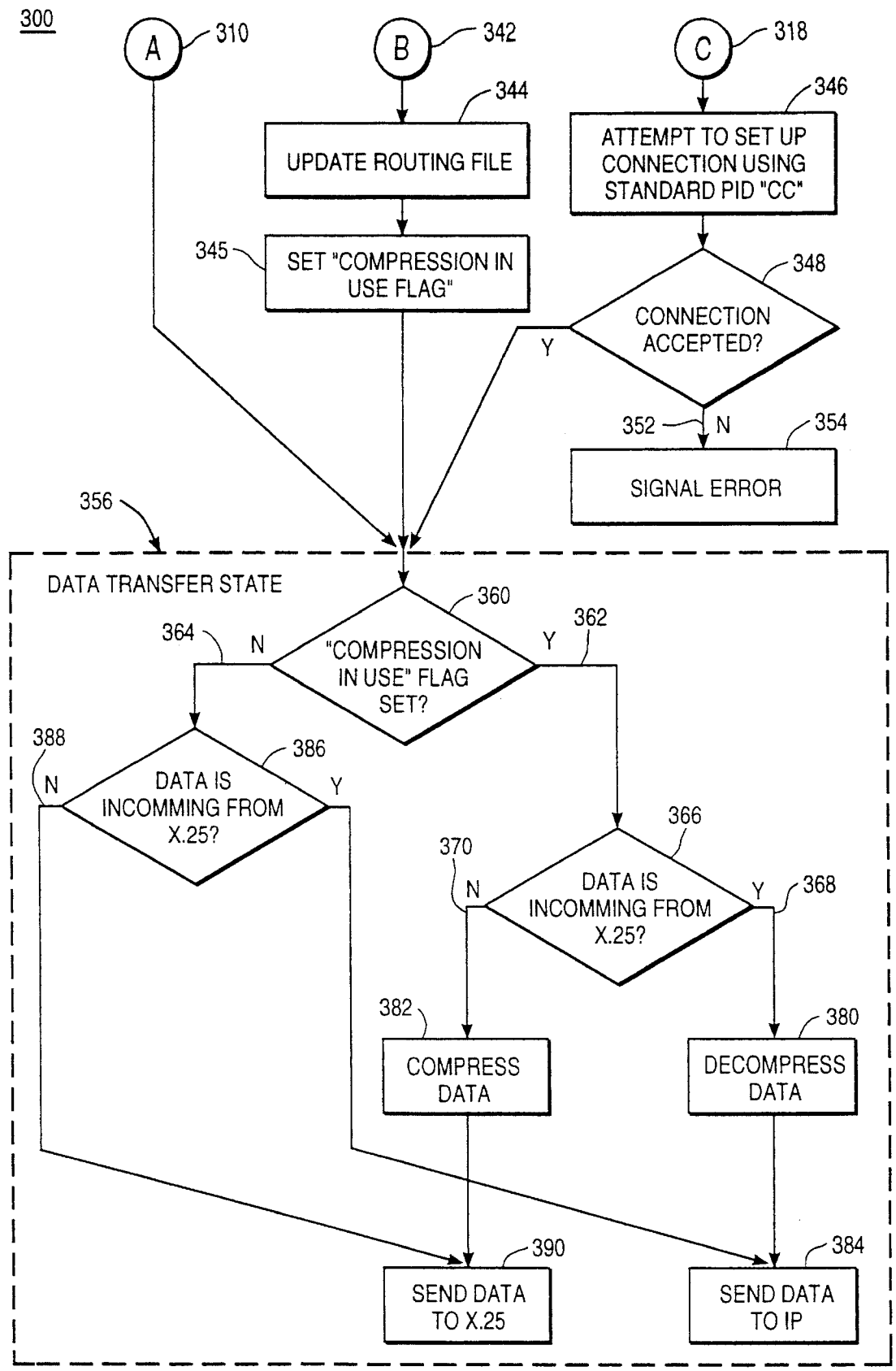
FIG. 9 illustrates a block diagram of the Call Request and Response procedure of the present invention.

Referring now to FIGS. 8 & 9, a flow chart of the presently preferred embodiment of the method of the invention 300 as it operates within the RFC 1144 and Call Control module is now described. In FIG. 8 the process begins as IP/X.25 traffic 302 is detected. It is first determined whether there is an existing suitable X.25 connection for this message 304. If there is 306 then the existing connection is used 308 and the data transfer is effected 356 with the processing thereafter as a normal X.25 call. If there was not an existing suitable X.25 connection for this message 312, the "config" file is checked 314 to determine if "use of compression" is indicated in this file. The "config" file is the main, global configuration file for all IP over X.25 connections. If use of compression is not indicated in the config file 316 then an attempt is made to establish a standard (i.e. no header compression) X.25 connection using the standard PID "CC" 346. If the remote terminal accepts the "CC" connection 350 then the routing table is updated with that fact and the data transfer continues 356. If use of compression is indicated in the config file 320, a further test is made to determine whether the "always try compression" flag is set 322 in the config file. If so 324 then an attempt is made to establish a connection using a PID set to "EF" 334. If the connection is accepted 342 then the "routing" file is updated 344 to add an entry to this file if one does not exist for the remote host or to overwrite the existing entry for that host if one does exist. Again the data transfer step 356 is then executed as before. If the remote host does not accept the connection using the PID=EF 338 the routing table is updated to reflect this fact 340 and the PID is changed to "CC" and the connection attempted again 346. This leg of the process continues as described before. Back at step 322 if the "always try compression" flag in the config file is not set 326, the "routing" file is tested 328. This "routing" file contains information about routes to individual hosts, including whether or not compression is supported by a given host. If the routing file indicates that the particular host supports compression 332 then the system sets the PID equal to EF and the connection is attempted 334 as described above. If the routing file indicates that the particular host does not support compression 330 then the system sets the PID equal to CC and the connection is attempted 346 as described above. In those cases where the CC connection, that is the standard non-compression X.25 connection, is not accepted 352 the system returns a signal error 354 to the requesting host indicating that the connection cannot be made.

Based upon the PID settings and related flags in the routing table, the data transfer 356 process then includes processes which test to see if the message is incoming in which case the header may be decompressed, or if the message is outgoing the header would or would not be compressed depending on the compression support indicated by the flags. This is accomplished as follows: within the Data Transfer section 356 the "Compression in use" flag is tested 360, and if it is set to "yes" 362 and the data is incoming from X.25 data 368 the header is decompressed 380 and passed to IP 384. If the "Compression in use" flag is set to "yes" 362 and the data is outgoing to X.25 data 370 the header is compressed 382 and passed to X.25 processing 390. If the "Compression in use" flag is tested 360, and if it is set to "no" 364 and the data is incoming from X.25 data 386 the data is passed to IP 384. If the "Compression in use" flag is set to "no" 364 and the data is not incoming from X.25 data 388 the data is passed to X.25 processing 390.

While the present invention has been described with references to FIGS. 1–10, it will be appreciated that the figures are for illustration only, and are not to be taken as limitations on the present invention. Similarly, the present embodiment of the invention has been described in terms of specific programs, modules, protocol interfaces between modules and other specific implementations and it will be appreciated by those skilled in these network systems arts that these specifics are for illustration only, and are not to be taken as limitations on the present invention.

We claim:

1. A method for using TCP/IP header compression/decompression in a communications network which uses an X.25 packet switching link, and which includes one or more nodes which support said header compression/decompression and one or more nodes which do not support said header compression/decompression, a node containing a computer system which includes a processor, memory and program instructions, the method being implemented by said program instructions and comprising the steps of:

initiating a first call request to a remote data terminal equipment (STE) over a TCP/IP/X. 25 network link, said first call request being issued by a local DTE, before the local DTE sends a plurality of compressed header data to said remote DTE;

using a specific protocol identifier (PID) in a user data field of a call request packet containing said first call request to indicate that said local DTE is using TCP/IP header compression/decompression;

returning a message by said remote DTE to said local DTE to indicate whether said remote DTE is adapted to support TCP/IP header compression/decompression; and using said TCP/IP header compression/decompression in said TCP/IP X.25 network link if said remote DTE indicates that said remote DTE can support said TCP/IP header compression/decompression.

2. The method described, in claim 1 comprising the additional steps of: said local DTE changing said specific PD to a standard PD which indicates that a standard TCP/IP uncompressed header is being used, if said remote DTE indicates no support for TCP/IP header compression/decompression;

transmitting a second call request to said remote DTE containing said standard PID;

said remote DTE returning a message to said local DTE to indicate that said remote DTE will accept a standard TCP/IP uncompressed header; and using TCP/IP without header compression in said TCP/IP/X.25 network link for communications between said local DTE and said remote DTE.

3. The method described in claim 1 comprising the additional step of updating a routing table in said local DTE to indicate whether said remote DTE supports TCP/IP header compression/decompression or not.

4. The method described in claim 1 comprising the additional step of updating a routing table in said local DTE with a specific indicator value to indicate whether said remote DTE supports TCP/IP header compression/decompression or not, said specific indicator value being settable by a systems administrator prior to sending said first call request and sail specific indicator value being settable by said local DTE as a result of said message returned by said remote DTE in response to said first call request.

5. A telecommunications system comprising:

a local data terminal equipment (STE) comprising a processor, a memory, a program in said memory, said program including instructions for controlling communications;

a remote DTE, connectable to said local STE through a TCP/IP/X.25 network link, said network link comprising one or more DTEs which support use of TCP/IP header compression/decompression and one or more terminals which cannot support said use of TCP/IP header compression/decompression;

a first device in said local DTE adapted to transmit a first call request to said remote DTE over said TCP/IP/X.25 network link, before the local DTE sends a plurality of compressed header data to said remote DTE, wherein said first call request contains a specific protocol identifier (PID), said specific PID indicating that said local DTE supports use of TCP/IP header compression/decompression;

a second device in said remote DTE which recognizes said specific PID in said first call request and responds to local DTE with a message which indicates whether said remote DTE supports use of TCP/IP header compression/decompression or not.

6. The telecommunications system described in claim 5 wherein said local DTE can use said TCP/LP header compression/decompression in said TCP/IP/X.25 network link if said remote DTE indicates that said remote DTE can support said TCP/IP header compression/decompression.

7. The telecommunications system described in claim 5 wherein said local DTE can change said specific PID to a standard PID which indicates that a standard TCP/IP uncompressed header is being used, if said remote DTE has indicated no support for TCP/IP header compression/decompression, and said local DTE can transmit a second call request to said remote DTE containing said standard PID.

8. The telecommunications system described in claim 7 wherein said remote DTE is can return a message to said local DTE to indicate that said remote DTE will accept a standard TCP/IP uncompressed header.

9. The telecommunications system described in claim 8 wherein said local DTE can communicate with said remote DTE using TCP/IP without header compression in said TCP/IP/X.25 network link upon receiving said message indicating that said remote DTE will accept a standard TCP/IP uncompressed header.

10. The telecommunications system described in claim 5 wherein said local DTE can update a routing table in said local DTE to indicate whether said remote DTE supports TCP/IP header compression/decompression or not.

11. The telecommunications system described in claim 5 wherein said local DTE can update a routing table in said local DTE with a specific indicator value to indicate whether said remote DTE supports TCP/IP header compression/decompression or not, said specific indicator value being set prior to sending said first call request or said specific indicator value being set by said local DTE as a result of said message returned by said remote DTE in response to said first call request.

12. A local data terminal equipment (DTE) including a processor, a memory, a program in said memory, said program including instructions for controlling communications, said DTE comprising:

a first device in said local DTE which transmits a first call request to a remote DTE over a TCP/IP/X.25 network line, before the local DTE sends a plurality of compressed header data to said remote DTE, wherein said first call request contains a specific protocol identifier (PID), said specific PID indicating that said local DTE supports the use TCP/IP header compression/decompression, said network link comprising one or more DTEs which can supports use of TCP/IP header compression/decompression and one or more terminals which cannot support said use of TCP/IP header compression/decompression;

a second device in said local DTE which recognizes said a message from said remote DTE which indicates whether said remote DTE supports TCP/IP header compression/decompression or not.

13. The local DTE described in claim 12 wherein said local DTE can use said TCP/IP header compression/decompression in said TCP/IP/X.25 network link if said remote DTE indicates that said remote DTE can support said TCP/IP header compression/decompression.

14. The local DTE described in claim 12 wherein said local DTE can change said specific PID to a standard PID which indicates that a standard TCP/IP uncompressed header is being used, if said remote DTE has indicated no support for TCP/IP header compression/decompression, and wherein said local DTE can transmit a second call request to said remote DTE containing said standard PID.

15. The local DTE described in claim 12 wherein said local DTE can communicate with said remote DTE using TCP/IP without header compression in said TCP/IP/X.25 network link upon receiving said message indicating that said remote DTE supports a standard TCP/IP uncompressed header.

16. The local DTE described in claim 12 wherein said local DTE can update a routing table in said local DTE to indicate whether said remote DTE supports TCP/IP header compression/decompression or not.

17. The local DTE described in claim 12 wherein said local DTE can update a routing table in said local DTE with a specific indicator value to indicate whether said remote DTE supports TCP/IP header compression/decompression or not, said specific indicator value being set prior to sending said first call request or said specific indicator value being set by said local DTE as a result of said message returned by said remote DTE in response to said first call request.

* * * * *